May 7, 1929.  O. SAMMINIATELLI  1,711,859
DISPLAY DEVICE
Filed March 21, 1928    4 Sheets-Sheet 1
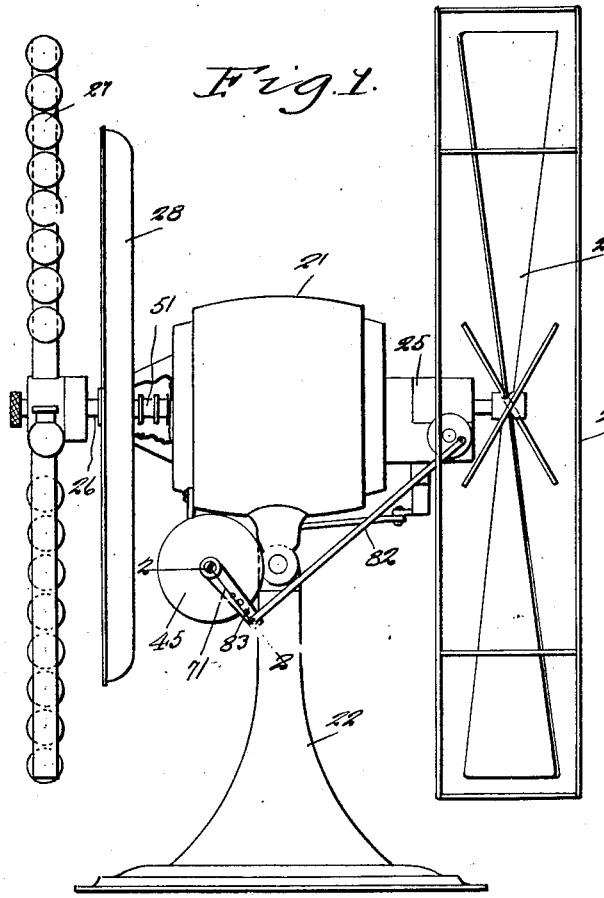
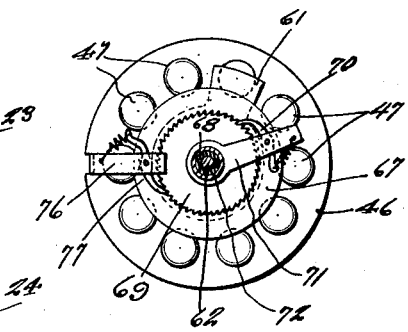
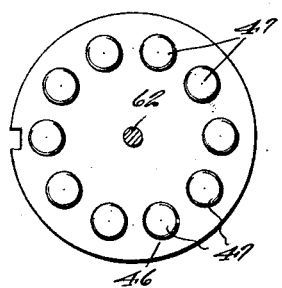
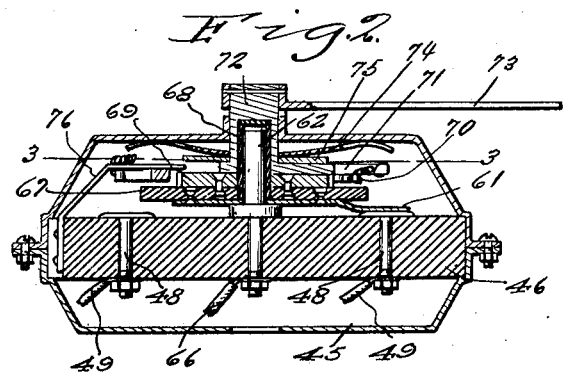
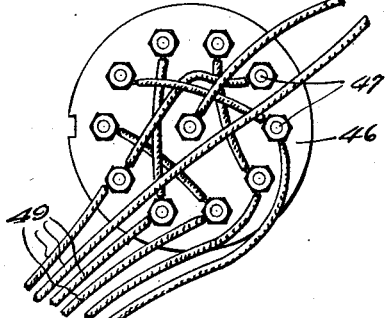
Oreste Samminiatelli
INVENTOR
BY Victor J. Evans
ATTORNEY
WITNESS:

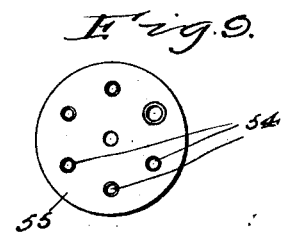
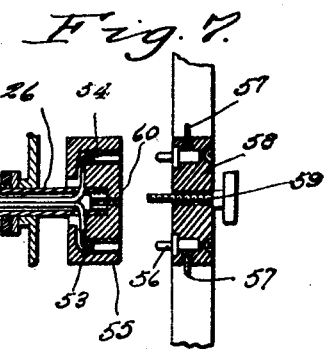
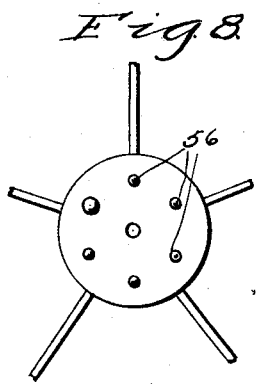
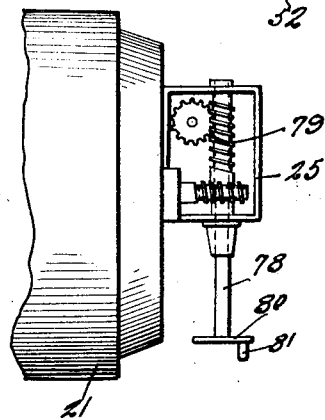
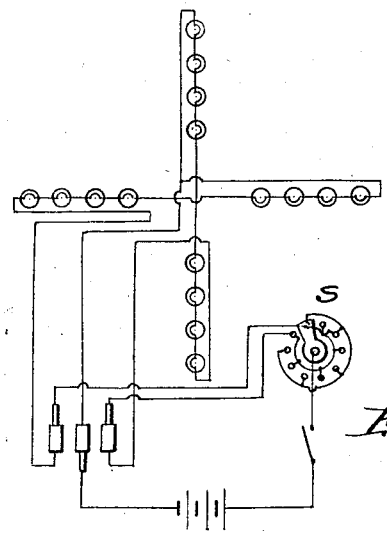
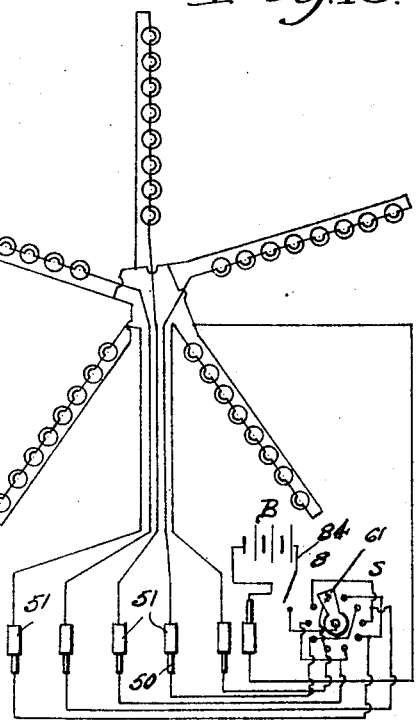
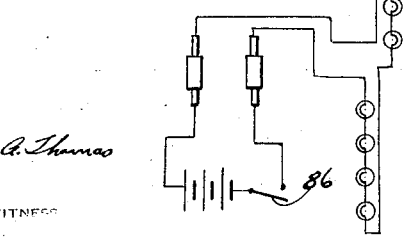

May 7, 1929.  O. SAMMINIATELLI  1,711,859

DISPLAY DEVICE

Filed March 21, 1928  4 Sheets-Sheet 3

Oreste Samminiatelli INVENTOR

BY Victor J. Evans
ATTORNEY

WITNESS

May 7, 1929.   O. SAMMINIATELLI   1,711,859
DISPLAY DEVICE
Filed March 21, 1928   4 Sheets-Sheet 4
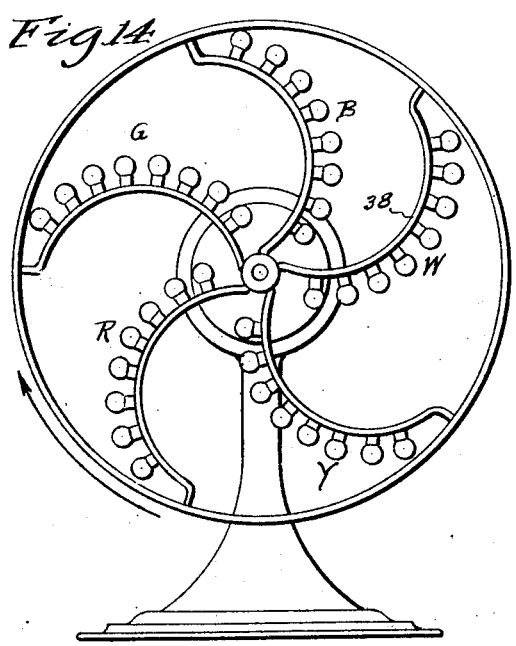
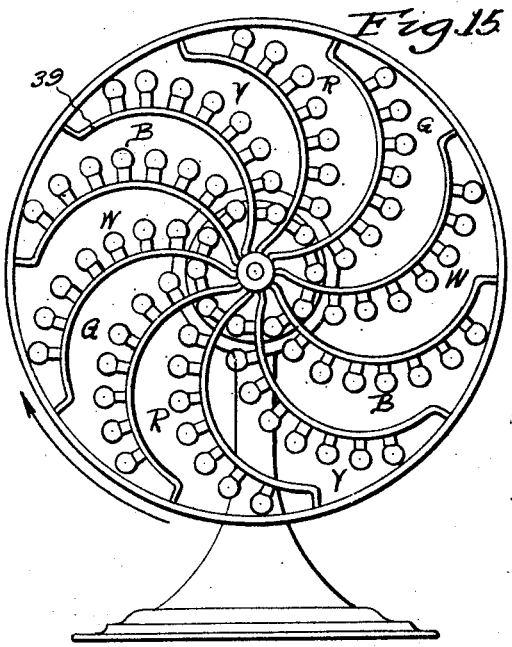
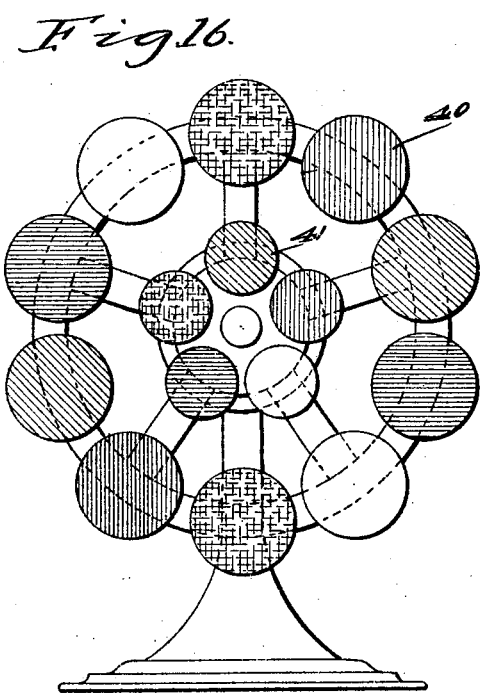
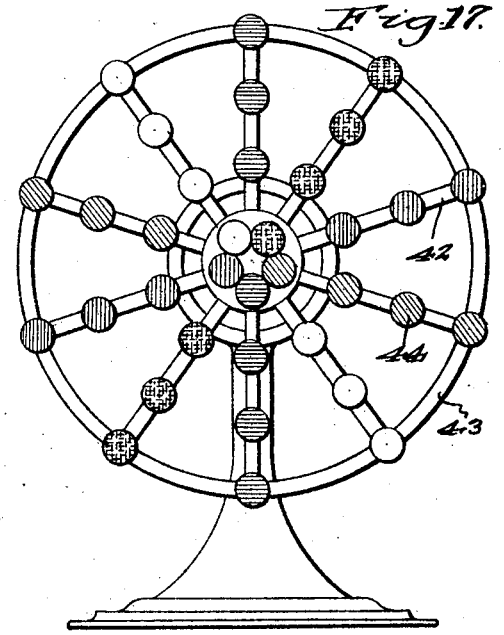
Oreste Samminiatelli INVENTOR
BY Victor J. Evans
ATTORNEY Patented May 7, 1929.

1,711,859

UNITED STATES PATENT OFFICE.

ORESTE SAMMINIATELLI, OF EAST TOLEDO, OHIO.

DISPLAY DEVICE.

Application filed March 21, 1928. Serial No. 263,455.

This invention relates to display devices and is an improvement upon the display device disclosed in an application filed by me December 2, 1927, Serial No. 237,279.

An object of the present invention is to provide a display device which may be mounted upon an electric fan, and which includes a plurality of electric elements arranged in groups, with means to successively control and render one or more of the groups active, together with means to operate the group controlling means from the oscillating mechanism of the fan.

With the above and other objects in view, the invention further includes the following novel features and details of construction, to be hereinafter more fully described, illustrated in the accompanying drawings and pointed out in the appended claims.

In the drawings:—

Figure 1 is an elevation illustrating the invention.

Figure 2 is an enlarged sectional view through the controlling switch, the view being taken substantially on the line 2—2 of Figure 1.

Figure 3 is a section taken substantially on the line 3—3 of Figure 2 with the housing removed.

Figure 4 is a detail elevation of the insulating contact carrying block.

Figure 5 is a view of the block looking at the reverse from that shown in Figure 4.

Figure 6 is a fragmentary plan view partly in section showing the connection between the switch operating mechanism and the fan oscillating mechanism.

Figure 7 is a fragmentary section showing the electrical connection between the fan and the display device.

Figure 8 is a fragmentary elevation of the hub of the display device.

Figure 9 is an elevation of the insulating block or socket member shown in Figure 7.

Figures 10 to 17 are elevations of different forms of display devices.

Figures 18, 19 and 20 are wiring diagrams.

Figure 10:
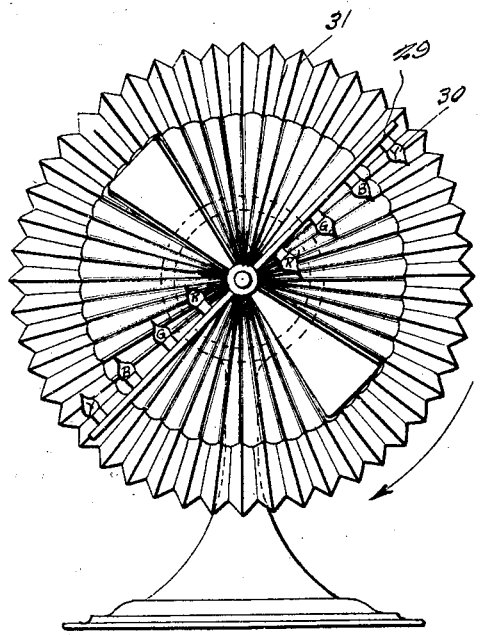

Referring to the drawings in detail wherein like characters of reference denote corresponding parts, the invention is shown as applied to an electric fan of the oscillating type, wherein the housing of the fan motor is indicated at 21, the pedestal at 22, the fan blades at 23, the guard at 24 and the housing for the oscillating drive mechanism at 25.

Figure 11:
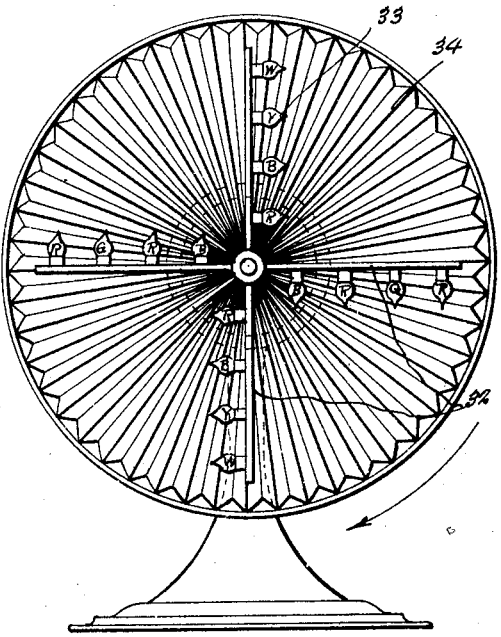
Figure 12:
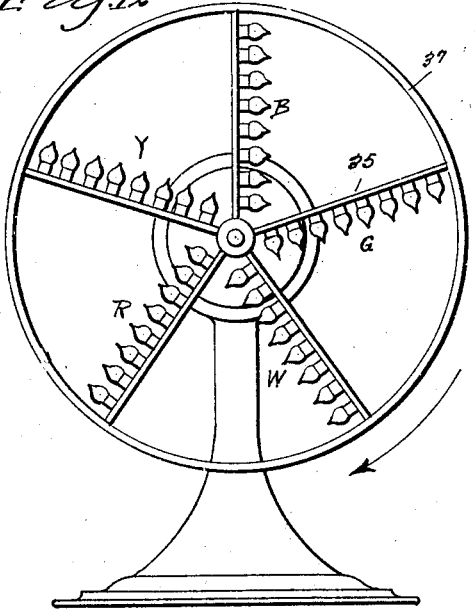
Figure 13:
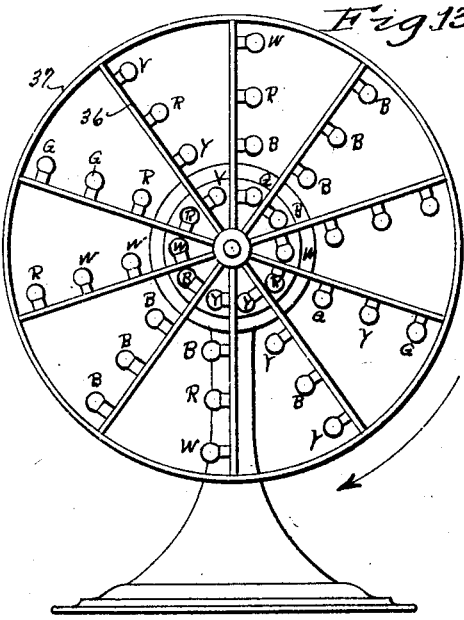

The display device which is adapted to be mounted upon an extension 26 of the shaft motor, is indicated in Figure 1 at 27 and may have used in connection therewith a reflector 28. The display device may be of various types and may consist of oppositely extending arms 29 carrying electric bulbs 30 of different colors, while the reflector 31 may be corrugated or fluted as shown. It may also consist of oppositely extending arms 32 as shown in Figure 11, wherein four arms are employed instead of two as shown in Figure 10. The arms 32 may also carry differently colored lamps 33 and may be backed up by a reflector 34 of a different configuration than that shown in Figure 10. If desired, the arms may be arranged as shown at 35 in Figure 12 or at 36 in Figure 13 and these arms may have their outer ends connected by rings 37. In Figures 10 and 11 the colors of the lamps may be alternately arranged, R indicating red, G green, B blue, W white and Y yellow, or they may be arranged in groups as shown in Figure 12 with each group of the same color as indicated by the reference characters B, G, R, W and Y. The arrangement of the lamps shown in Figure 13 is slightly different, some of the arms carrying a single group while other groups are divided between other arms.

The arms 38 and 39 which are shown in Figures 14 and 15 respectively are curved, Figure 15 including a greater number of arms than Figure 14. In these figures, the lamps which are carried by the arms are arranged in the groups indicated.

In Figure 16 a different configuration of display device is shown, the lamps 40 being arranged in a circle around lamps 41. The lamps 40 and 41 are of a larger size than those shown in the other forms of the invention, the lamps 40 being relatively larger than the lamps 41 and arranged in the colors indicated.

The display device shown in Figure 17 includes radially disposed arms 42 which are connected by a ring 43 and these arms carry groups of lamps 44 of various colors as shown.

In order to successively illuminate the different groups of lamps, the invention provides a switch which includes a housing 45 within which is mounted an insulating block 46. This block carries spaced contacts 47 which are mounted upon screws 48, the latter extending through the block 46 and providing binding posts for conductor wires 49. These posts may be electrically connected as shown in Figure 5 and may in turn be electrically connected to brushes 50 and collector rings 51.

The rings 51 are connected by means of conductors 52 with contacts 53 which are located within the inner ends of sockets 54 provided in an insulating block 55, the latter being carried by the extension 26 of the motor shaft.

The sockets 54 receive contact pins 56 which are connected with the various lamps by means of conductors 57. The contact pins 56 are carried by the insulated hub 58 of the frame of the display device. The hub is secured in place by means of a screw 59 which engages a threaded socket or sleeve 60 carried by the block 55.

The controlling or distributing switch further includes a movable contact arm 61 which is mounted for rotation upon a post 62 which is carried by and extends from the block 46 and which provides a binding post for connection with a conductor 63, which may lead to a suitable source of current. The arm 61 is carried by an insulating disk 67 which is rotatable upon but insulated from the post 62 by means of a sleeve 68. Secured to the disks 67 is a ratchet wheel 69 whose teeth are engaged by a spring influenced dog 70 carried by an arm 71. The arm 71 is also rotatable upon the sleeve 68 and is carried by a socketed hub 72 which extends through an opening provided in the housing 45. A lever 73 is secured upon the outer end of the hub 72 to provide means for rotating the hub.

By reference to Figures 2 and 3 of the drawings it will be seen that when the arm 73 is actuated, the arm 71 will also be operated so that the dog 70 will engage the teeth of the ratchet wheel 69 to rotate the latter and move the contact arm over the contacts 47. A spring 74 acts to hold the parts properly assembled, while a disk or washer 75 is interposed between this spring and the arm 71. The block 46 carries an arm 76 which in turn carries a spring influenced holding dog 77 which also engages the teeth of the ratchet wheel 69.

In order to operate the arm 73, the shaft 78 of the gearing 79 which oscillates the fan is extended and has mounted thereon a disk 80. This disk carries an eccentric pin 81 to which is pivotally connected one end of a rod 82. The other end of this rod is connected to the arm 73 and the latter may be provided with a plurality of openings 83 so as to provide for adjustment and regulate the throw of the arm 73 at each operation. By this means the travel of the contact or distributor arm 61 may be regulated.

In Figures 18 and 19 the controlling switch is indicated at S and the structure is the same as that described. The arm 61 of the switch S is in electrical connection with a source of current or battery B by means of a conductor 84, a switch 85 being included in this conductor.

In Figure 20, the switch S is dispensed with, the lamps of the display device all being illuminated by closing the switch 86.

It will be apparent from the foregoing description and accompanying drawings that operation of the fan motor will rotate the display device and the controlling or distributing switch will be actuated by the oscillating mechanism of the fan to impart a step by step movement to the arm 61. With the arm in the position shown in Figure 3, one or more groups of white lights will be illuminated as the arm engages one of the contacts 47 of the white lights W. The next step of the arm will be in a counterclockwise direction so that the white light group or groups and the red light group or groups will be illuminated.

Upon the next movement of the arm 61, only the red light group or groups will be illuminated, while a further movement of the arm will illuminate the red light group or groups and the green light group or groups, etc. A very pleasing effect is thus obtained.

The invention is adapted for many uses. For example, it may be used as a window or store display and will attract ready attention, the same current which operates the fan being also used to rotate the display device. This renders it useful as a window display while the fan is being used to stir up and agitate the air in a store or other room. The invention will also form an attractive ornament and for this reason is useful at Christmas and Fourth of July and other celebrations, and upon many other occasions.

The invention is susceptible of various changes in its form, proportions and minor details of construction and the right is herein reserved to make such changes as properly fall within the scope of the appended claims.

Having described the invention what is claimed is:

1. In combination with an oscillating electric fan and a display device carried thereby and including a plurality of electric devices, a switch including spaced contacts connected in circuit with the electric devices, a movable distributor arm engaging said contacts to distribute current to said devices and means operatively connecting the distributor arm with the oscillating mechanism of the fan to actuate said arm.

2. In combination with an oscillating electric fan and a display device carried thereby and including a plurality of electric devices, a switch including spaced contacts connected in circuit with the electric devices, a movable distributor arm engaging said contacts to distribute current to said devices, an eccentric operated by the oscillating mechanism of the fan, and means operatively connecting the eccentric and distributor arm to actuate the latter.

3. In combination with an oscillating electric fan and a display device carried thereby and including a plurality of electric devices, a switch including spaced contacts connected in circuit with the electric devices, a movable distributor arm engaging said contacts to distribute current to said devices, an eccentric operated by the oscillating mechanism of the fan, and adjustable means operatively connecting the eccentric and distributor arm to actuate the latter.

4. In combination with an oscillating electric fan and a display device carried thereby and including a plurality of electric devices, a switch including spaced contacts connected in circuit with the electric devices, a movable distributor arm adapted to alternately engage one and a pair of said contacts to distribute current to said devices and provide different combinations, and means operatively connecting the eccentric and distributor arm to actuate the latter.

In testimony whereof I affix my signature.

ORESTE SAMMINIATELLI.